Aug. 28, 1951  A. LEGROS  2,566,219
MAPLE SAP FLOAT GAUGE
Filed Sept. 11, 1947  2 Sheets-Sheet 1
Fig. 1.
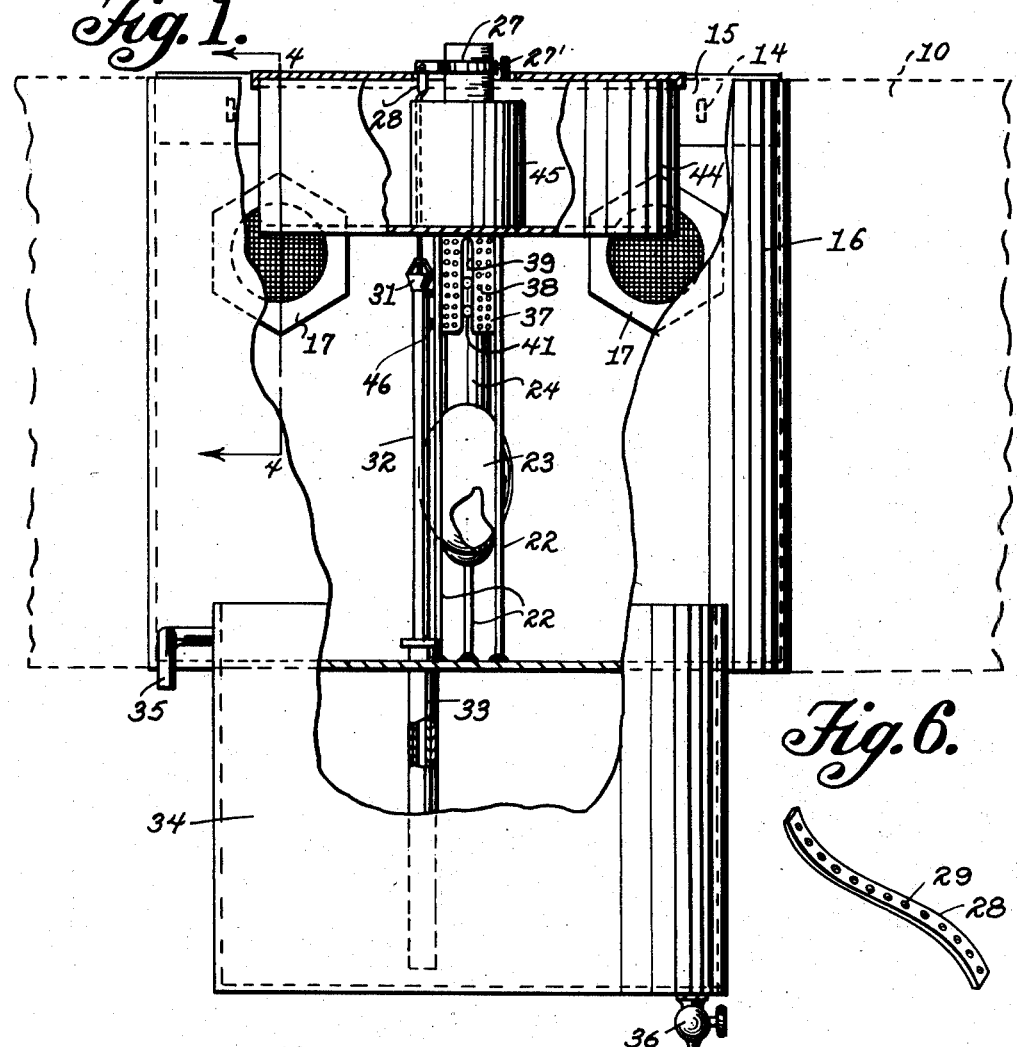
Fig. 6.
Fig. 4.
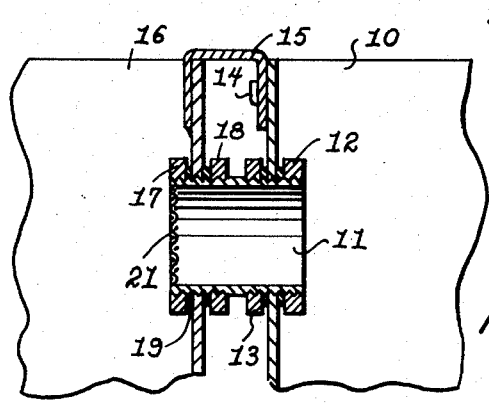
INVENTOR.
Auguste Legros
BY Victor J. Evans & Co.
ATTORNEYS Aug. 28, 1951 A. LEGROS 2,566,219
MAPLE SAP FLOAT GAUGE
Filed Sept. 11, 1947 2 Sheets-Sheet 2

INVENTOR.
Auguste Legros
BY *Victor J. Evans & Co.*
ATTORNEYS

UNITED STATES PATENT OFFICE 2,566,219

MAPLE SAP FLOAT GAUGE

Auguste Legros, Saint Jean Port Joli, Quebec, Canada

Application September 11, 1947, Serial No. 773,427

2 Claims. (Cl. 137—68)

This invention relates to a maple sap float gauge.

It is an object of the present invention to provide a maple sap gauge which may be attached to a sap evaporator which is adapted to receive the syrup and which will dispense the syrup only when the same has been boiled down to a predetermined density and according to the setting of the float gauge, the gauge being adjustable to different settings.

Other objects of the present invention are to provide a maple sap float gauge for sap evaporators which is of simple construction, easy to adjust and set, inexpensive to manufacture and efficient in operation.

Figure 2:
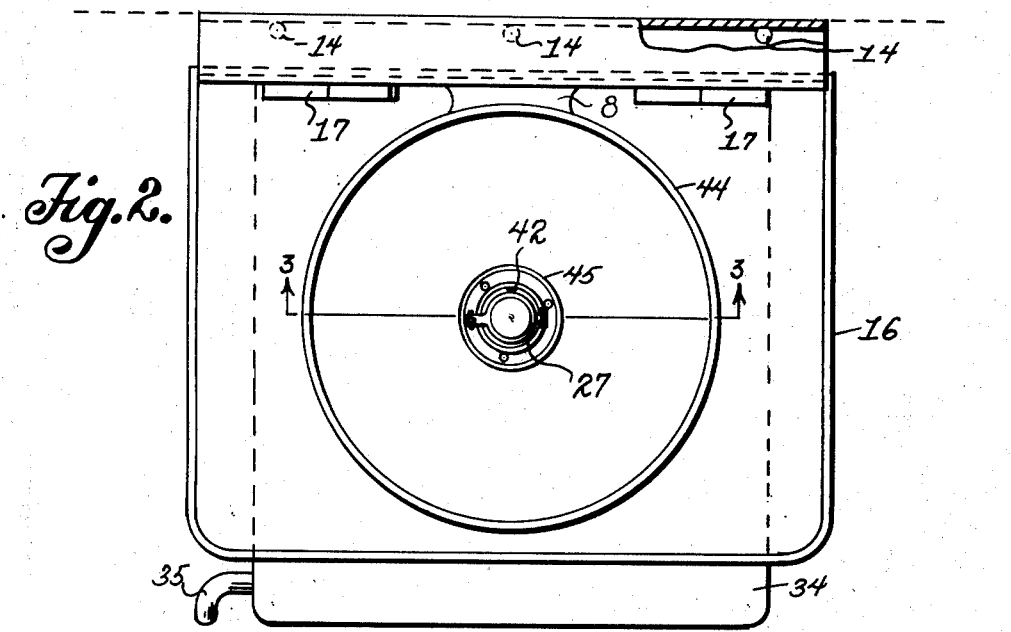
Figure 3:
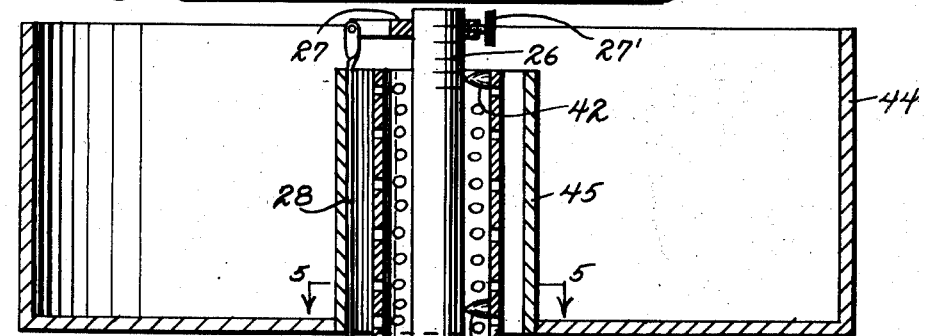
Figure 5:
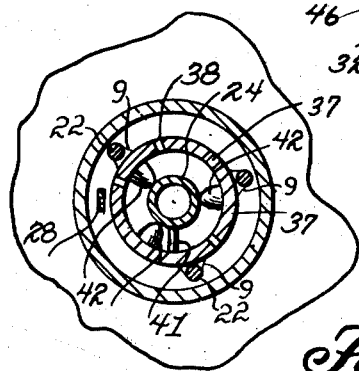

For a better understanding of the invention, reference may be had to the following detailed description taken in connection with the accompanying drawing, in which Fig. 1 is an end elevational view of the float gauge as connected to the end of a sap evaporator tank with portions broken away to show the internal parts thereof, Fig. 2 is a top plan view of my maple sap float gauge, Fig. 3 is an enlarged cross-sectional view, in elevation, of the gauge as viewed on line 3—3 of Fig. 2, Fig. 4 is an enlarged cross-sectional view taken through the coupling connection of the gauge with the tank and as viewed on line 4—4 of Fig. 1, Fig. 5 is a transverse cross-sectional view taken on line 5—5 of Fig. 3, Fig. 6 is a perspective view of the adjustable flexible strap which is connected between the outlet valve member and the float rod.

Referring now to the figures, 10 represents a maple sap evaporator adapted to contain large quantities of the fresh sap and under which a fire is built to boil the sap for conversion into maple syrup. In the side wall of the tank is an opening into which is extended a coupling 11 which is fixed by lock nuts 12 and 13 to the tank wall, Fig. 4. On the tank 10 are hooks 14 to which are connected attaching pieces 15 of a float gauge tank 16. The coupling 11 is likewise fixed within an opening in the gauge tank wall by lock nuts 17 and 18. Gaskets 19 are preferably used with the lock nuts to prevent leakage. A strainer 21 is fitted in the coupling 11 to prevent the passage of sludge to the gauge tank. There are preferably two of these couplings 11 connected as described between the evaporator and the gauge tank as viewed in Figs. 1 and 2.

Extending upwardly from the bottom of the gauge tank 16 are guide rods 22 between which there is located for floating movement a float 23 preferably made of light weight material and hollow. On the top of the float there is secured a float rod 24 the connection between it and the float 22 being effected through threads 25, Fig. 3. The upper end of the rod is graduated as indicated at 26 and to the same there may be connected a clamp 27 which supports a flexible copper strap 28, Fig. 6, having holes 29 therein and an outlet valve plug 31 in the upper end, an outlet pipe 32 which extends downwardly through the bottom of the tank 16 and into a pipe 33 to discharge the syrup into a receiver 34 having a drain 35 at its upper end under which a pail is disposed for the collection of the syrup. To drain the bottom of the receiver 34 a pet cock 36 will be opened.

Above the float 23 and surrounding the rod 24 is a guide sleeve 37 having holes 38 therein. This sleeve has a vertically-extending slot 39 to receive pin projections 41 on the rod 24 whereby to prevent the rotation of the rod when being adjusted. Within the sleeve 37 are inwardly extending projections 42 for the purpose of keeping the rod 24 centered therewithin. The sleeve 37 is secured to the rods 22, as by welding, the welds being indicated by the numeral 9, so as to provide a support for the sleeve 37.

In order to help keep the syrup from collecting about the upper end of the rod 24 and sleeve 37, there is provided a casing 44 having at its center an upstanding sleeve 45 through which the rod and sleeve are extended. The casing 44 also provides a support for member 45, the member 45 coacting with the sleeve 37 to define a space therebetween for the up-and-down movement of strap 28.

The pipe 32 is secured at its upper end to the sleeve 37 by weld connections 46. The holes 38 in the sleeves 37 allow syrup to pass freely therethrough in order to help prevent syrup from jamming or accumulating in the sleeve.

The clamp 27 can be connected at different locations on the rod 24 and secured by a set screw 27'.

The strap 28 is flexible and if there is a slack in the same, it will be taken up as the float rises to lift the plug 31 from the pipe 32. The slack will be to a greater or less extent depending from the location of the clamp 27 upon the rod 24. When syrup of the proper density has been obtained the float 23 will rise to open the plug 31 so that the syrup can be drawn. The casing 44 is supported by a bracket 8, the bracket 8 being secured to casing 44 and tank 16, as by welding.

While various changes may be made in the detail construction it shall be understood that such changes shall be within the spirit and scope of the present invention as defined by the appended claims.

I claim:

1. A maple sap float gauge comprising a gauge tank, a discharge pipe extending upwardly in the tank, a plug valve connected to the upper end of the discharge pipe, guide elements extending upwardly from the bottom of the tank, a float disposed between the guide elements, a sleeve connected to the upper end of the guide elements, a rod extending upwardly from the float and through the sleeve, a clamp adjustably connected to the uper end of the rod for different settings, and a flexible strap extending between the plug valve and the clamp on the float rod.

2. A maple sap float gauge as defined in claim 1 and said sleeve having guide slots therein, pin projections on the rod extending into the guide slots whereby to prevent the rotation of the rod, and said pipe being connected to and supported at its upper end by the sleeve.

AUGUSTE LEGROS.

REFERENCES CITED

The following references are of record in the file of this patent:

UNITED STATES PATENTS

| Number | Name | Date |
| --- | --- | --- |
| 368,544 | Morrison | Aug. 16, 1887 |
| 804,908 | Williams | Nov. 21, 1905 |
| 1,623,313 | Horton | Apr. 5, 1927 |
| 2,205,678 | Adams | June 25, 1940 |
| 2,348,757 | Samiran | May 16, 1944 |
| 2,417,976 | Franklin | Mar. 25, 1947 |